United States Patent
Duncan et al.

(10) Patent No.: US 7,171,681 B1
(45) Date of Patent: Jan. 30, 2007

(54) SYSTEM AND METHOD FOR PROVIDING EXPANDABLE PROXY FIREWALL SERVICES

(75) Inventors: William E. Duncan, Frederick, MD (US); Vincent Hwang, Potomac, MD (US)

(73) Assignee: Secure Computing Corporation, St. Paul, MN (US)

( * ) Notice: Subject to any disclaimer, the term of this patent is extended or adjusted under 35 U.S.C. 154(b) by 785 days.

(21) Appl. No.: 09/774,001

(22) Filed: Jan. 31, 2001

(51) Int. Cl.
G06F 9/00 (2006.01)
G06F 15/173 (2006.01)

(52) U.S. Cl. .................... 726/11; 726/12; 709/225

(58) Field of Classification Search ............. 713/201; 726/11–15; 709/225
See application file for complete search history.

(56) References Cited

U.S. PATENT DOCUMENTS

| | | | |
|---|---|---|---|
| 5,673,322 A * | 9/1997 | Pepe et al. ................. 705/52 |
| 6,321,267 B1 * | 11/2001 | Donaldson ................. 709/229 |
| 6,324,648 B1 * | 11/2001 | Grantges, Jr. .............. 713/201 |
| 6,546,423 B1 * | 4/2003 | Dutta et al. ................ 709/225 |
| 6,606,708 B1 * | 8/2003 | Devine et al. ............. 713/201 |
| 6,779,039 B1 * | 8/2004 | Bommareddy et al. .... 709/238 |
| 2002/0026502 A1 * | 2/2002 | Phillips et al. ............ 709/219 |
| 2002/0066027 A1 * | 5/2002 | Johnson et al. ............ 713/201 |
| 2002/0078203 A1 * | 6/2002 | Greschler et al. ......... 709/225 |
| 2002/0078382 A1 * | 6/2002 | Sheikh et al. .............. 713/201 |
| 2002/0083172 A1 * | 6/2002 | Knowles et al. ........... 709/225 |

OTHER PUBLICATIONS

TIS Internet Firewall Toolkit Overview, About The Toolkit and This Documentation.

Technical Support, Frequently Asked Questions, Gauntlet for UNIX.

Gauntlet Support, Configuring a Plug Gateway.

Advanced Research & Engineering, TIS Internet Firewall Toolkit, About The Toolkit and This Documentation.

Nokia Support, Nokia Internet Communications, CryptoCluster VNP Gateway Product FAQ.

Nokia Product Resource Library, AlchemyOS IP Clustering Benefits Enabling the Non-Stop Networking Infrastructure.

Nokia Products, CryptoConsole™ Management Software.

(Continued)

*Primary Examiner*—Nasser Moazzami
*Assistant Examiner*—Pramila Parthasarathy
(74) *Attorney, Agent, or Firm*—Schwegman, Lundberg, Woessner & Kluth, P.A.

(57) ABSTRACT

A mechanism that enables flexible expansion of proxy firewall services is disclosed. In accordance with the present invention, the firewall system can be configured to include a dispatch host computer and one or more load host computers. Proxy firewall services can be provided by proxy applications that reside on either the dispatch host computer and/or the load host computers. In one embodiment, a load host computer can be configured to support multiple proxy applications. In other embodiments, a load host computer can be dedicated to a single resource intensive application. In this framework, a network administrator can flexibly decide how to accommodate the demand for proxy firewall services. Load hosts can be added or removed from the firewall system without disrupting ongoing security services. In one embodiment, this feature is enabled through the inclusion of a configuration file on the dispatch host computer that stores information relating to the load host computers in the firewall system.

20 Claims, 5 Drawing Sheets

OTHER PUBLICATIONS

Nokia Products, SafeNet Remote Access Client.
Check Point Software Technologies Ltd., Enterprise Security Management, 2000.
Nokia Products, CryptoCluster™ VPN Gateways Introducing Active Session Failover™.
Nokia Support, Nokia Clustered IP Solutions FAQ.
Nokia Support, IP Clustering Q & A.
Nokia, Why Clustering?, The Challenge: Reliability and Scalability.
Nokia Products, CryptoConsole Management Software, Management at the Heart of the Architecture.
ZNYX, Technical Bulletin, Designing High Availability Switched LANs, 1999.
Check Point FireWall-1® Technical Overview, 1999, Check Point Software Technologies Ltd.

* cited by examiner

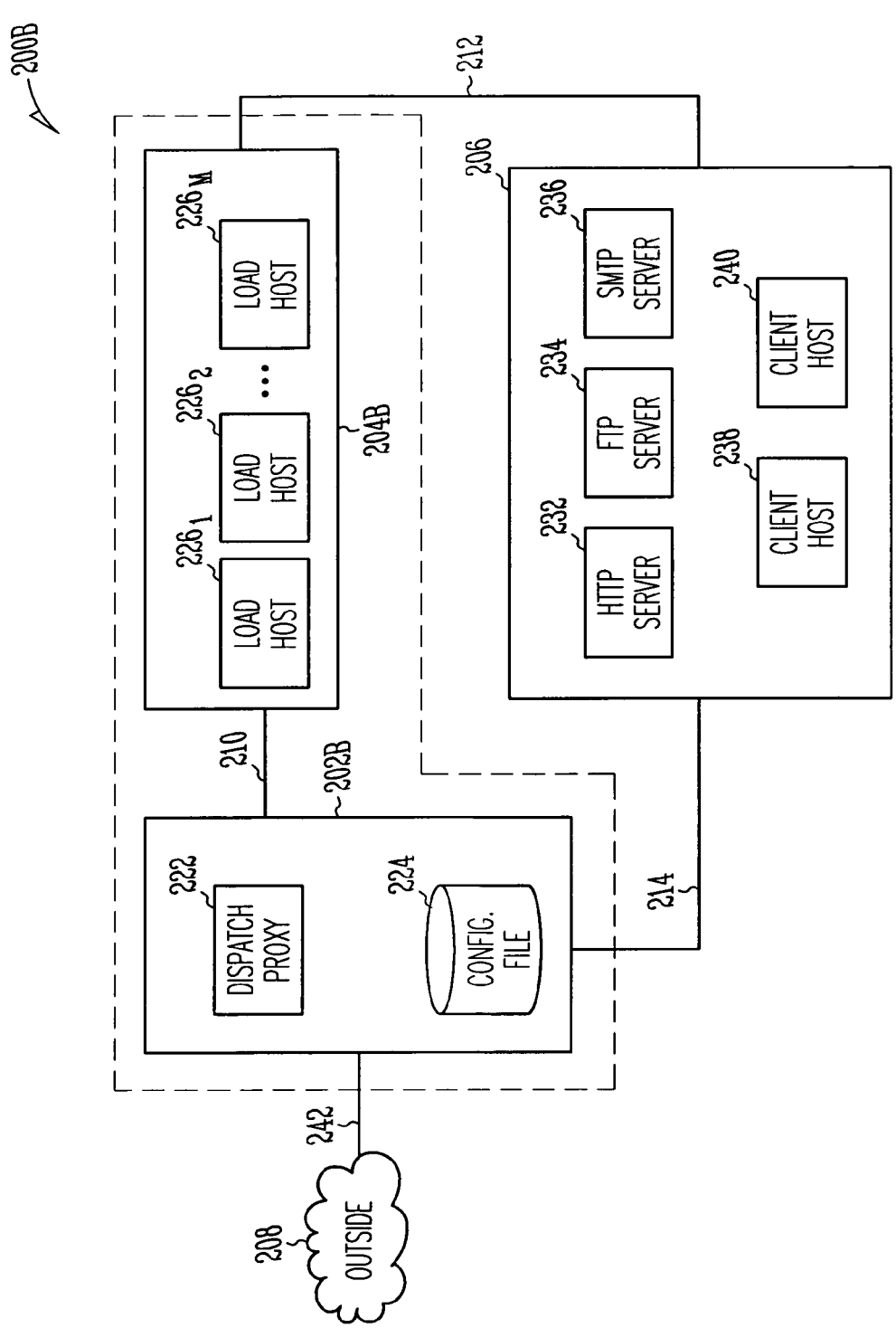

SYSTEM AND METHOD FOR PROVIDING EXPANDABLE PROXY FIREWALL SERVICES

BACKGROUND

1. Field of the Invention

The present invention relates generally to network security, and more particularly, to systems and methods for providing proxy firewall services.

2. Discussion of the Related Art

Firewalls are an essential ingredient in a corporate entity's network security plan. Firewalls represent a security enforcement point that separates a trusted network from an untrusted network. FIG. 1 illustrates a generic example of a network security plan that incorporates a firewall system. In this generic example, firewall system 120 is operative to screen all connections between private network 110 and untrusted system 140. These connections are facilitated by Internet network 130. In the screening process, firewall system 120 determines which traffic should be allowed and which traffic should be disallowed based on a predetermined security policy.

One type of firewall system is an application-level gateway or proxy server, which acts as a relay of application-level traffic. Proxy servers tend to be more secure than packet filters. Rather than trying to deal with the numerous possible combinations that are to be allowed and forbidden at the transmission control protocol (TCP) and Internet protocol (IP) level, the proxy server need only scrutinize a few allowable applications (e.g., Telnet, file transfer protocol (FTP), simple mail transfer protocol (SMTP), hypertext transfer protocol (HTTP), etc.). Generally, if the proxy server does not implement the proxy code for a specific application, the service is not supported and cannot be forwarded across the firewall. Further, the proxy server can be configured to support only specific features of an application that the network administrator considers acceptable while denying all other features.

Application-level firewall proxies are fragile, and are growing ever more complex. Current applications and services require increased firewall system resources. As a corporation's computer system and usage expands, the demand for through-put and the consumption of system resources by the firewall proxies become critical factors in the operation of the firewall.

Some proposed solutions to handle an increase in through-put demand or resource consumption are software-based solutions. One example of a software-based solution is to increase the number of proxy instances at the firewall. Another example is to increase the number of simultaneous connections allowed via proxy configuration attributes. These solutions are limited by the capacity of the existing hardware.

Other proposed solutions are hardware based. In one hardware based solution, the properties and characteristics of the hardware of the firewall host, such as capacity, memory, processor speed, etc, are increased. Another solution is to deploy load balancing hardware in front of the firewall that load balances traffic at the IP layer. This hardware is then subsequently configured to balance the load between firewall hosts. These hardware solutions typically require a re-installation and re-configuration of the firewall and network topology, a process which is time consuming and expensive.

As can be appreciated, conventional proposed solutions are limited in their ability to address the needs related to the ever-increasing through-put demand and resource consumption at firewall systems. What is needed therefore is a mechanism for enabling flexible scalability in the capacity of proxy firewall services without interrupting the operation of the firewall.

SUMMARY OF THE INVENTION

The present invention addresses the aforementioned needs by providing a mechanism that enables flexible expansion of proxy firewall services. In accordance with the present invention, the firewall system can be configured to include a dispatch host computer and one or more load host computers. Proxy firewall services can be provided by proxy applications that reside on either the dispatch host computer and/or the load host computers. In one embodiment, a load host computer can be configured to support multiple proxy applications. In other embodiments, a load host computer can be dedicated to a single resource intensive application. In this framework, a network administrator can flexibly decide how to accommodate the demand for proxy firewall services.

It is a feature of the present invention that load hosts can be added or removed from the firewall system without disrupting ongoing security services. In one embodiment, this feature is enabled through the inclusion of a configuration file on the dispatch host computer that stores information relating to the load host computers in the firewall system.

BRIEF DESCRIPTION OF THE DRAWINGS

The foregoing and other features and advantages of the invention will be apparent from the following, more particular description of a preferred embodiment of the invention, as illustrated in the accompanying drawings.

FIGS. 2A–2C illustrate embodiments of a proxy firewall service computer system.

DETAILED DESCRIPTION OF THE PREFERRED EMBODIMENTS

A preferred embodiment of the invention is discussed in detail below. While specific implementations are discussed, it should be understood that this is done for illustration purposes only. A person skilled in the relevant art will recognize that other components and configurations may be used without parting from the spirit and scope of the invention.

Application-level firewalls generally are hosts running proxy servers, which permit no traffic directly between networks. A proxy server is an application that mediates traffic between a protected network and the Internet. Proxy servers represent one of the basic building blocks of a corporation's network security infrastructure. Proxy applications are software components running on the proxy servers of the firewall. Proxy applications are often used instead of router-based traffic controls, to prevent traffic from passing directly between networks. Since proxy applications must understand the application protocol being used, they can also implement protocol-specific security. For example, an FTP proxy might be configurable to permit incoming FTP and block outgoing FTP.

Proxy servers are generally application specific, and look at application layer data. To support a new protocol via a proxy, a proxy must be developed to listen and provide minimal support, such as source and destination checks, for the new protocol. A proxy server can include one or more proxies that are each tailored to govern a supported application such as Telnet, rlogin, FTP, X-window, SMTP, HTTP, etc. The proxy consults a set of rules, or proxy policies, that can be defined and implemented to enforce a corporation's network security measure. As can be appreciated, rules can be defined for particular combinations of source, destination, and server or application.

Various firewall products are available on the market today. Firewalls can be packaged as system software, combined hardware and software, and more recently, dedicated hardware appliances (e.g., embedded in routers, or easy-to-configure integrated hardware and software packages that can run on dedicated platforms). An example of a commercial firewall product is the Gauntlet™ firewall by Network Associates, Inc.

Figure 1:
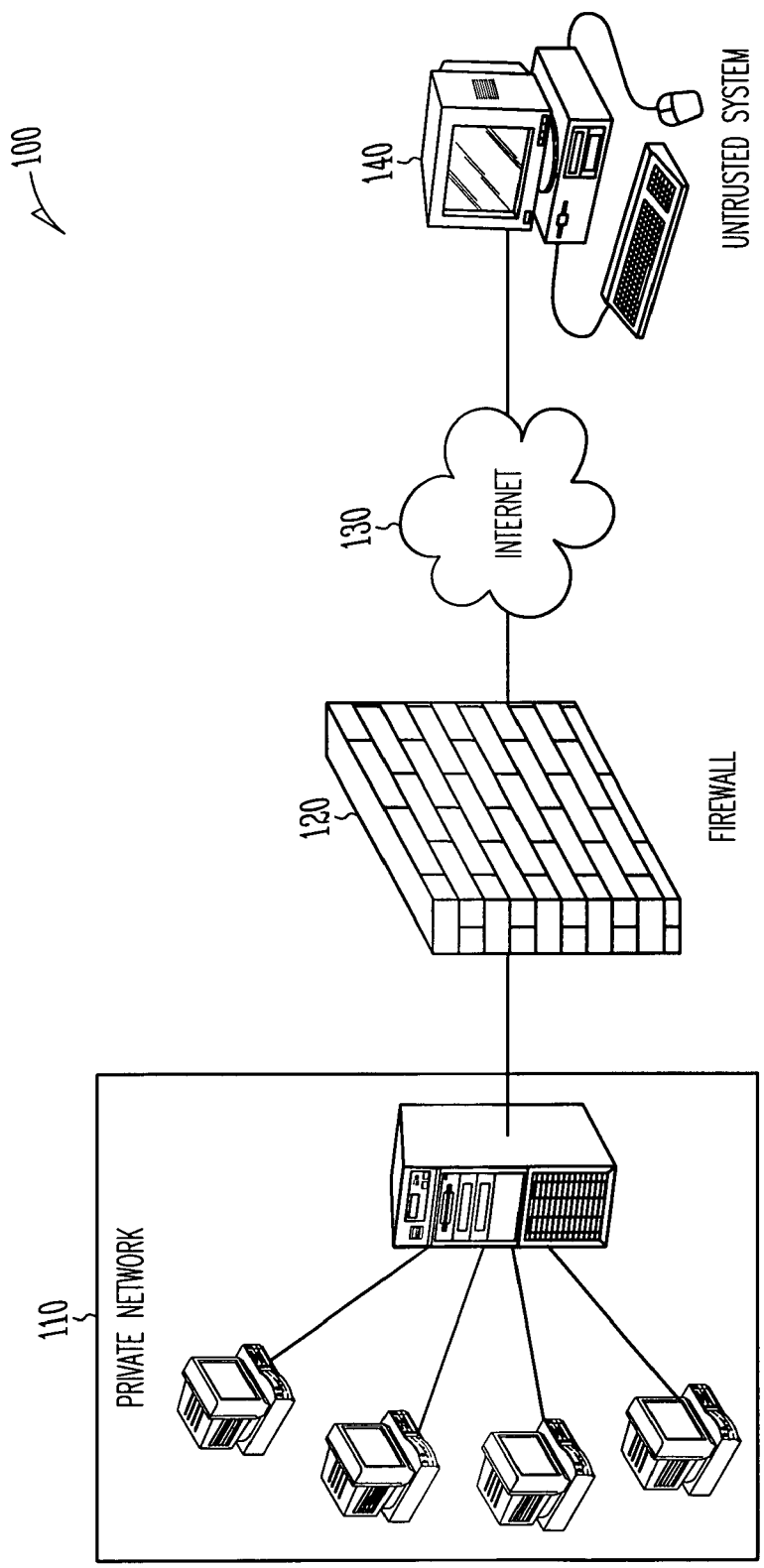
FIG. 1 illustrates a generic network security system.

As discussed above, FIG. 1 illustrates a generic example of a network security plan that incorporates a firewall system. In this example, firewall system 120 is operative to screen all connections between private network 110 and untrusted system 140. The firewall system 120 determines which traffic should be allowed and which traffic should be disallowed. As can be appreciated, a firewall system may be used to segment parts of a corporate network. For example, a firewall can be used to control information flow between a corporation's internal networks.

It is a feature of the present invention to provide load balancing of proxy firewall services. In accordance with the present invention, the firewall system can be configured to include a dispatch host computer and one or more load host computers. Proxy firewall services can be provided by proxy applications that reside on either the dispatch host computer and/or the load host computers. In one embodiment, a load host computer can be configured to support multiple proxy applications. In other embodiments, a load host computer can be dedicated to a single resource intensive application. In this framework, a network administrator can flexibly decide how to accommodate the demand for proxy firewall services.

Another feature is to provide an easily expandable firewall system. A system administrator can add another firewall module into the network as network traffic increases to share the load across the firewall modules. The firewall module can be added without disrupting ongoing security services. The proxy firewall system allows the system administrator to incrementally increase the overall proxy firewall service capacity without re-installing the firewall. In one embodiment, this feature is enabled through the inclusion of a configuration file on the dispatch host computer that stores information relating to the load host computers in the firewall system.

Figure 2A:
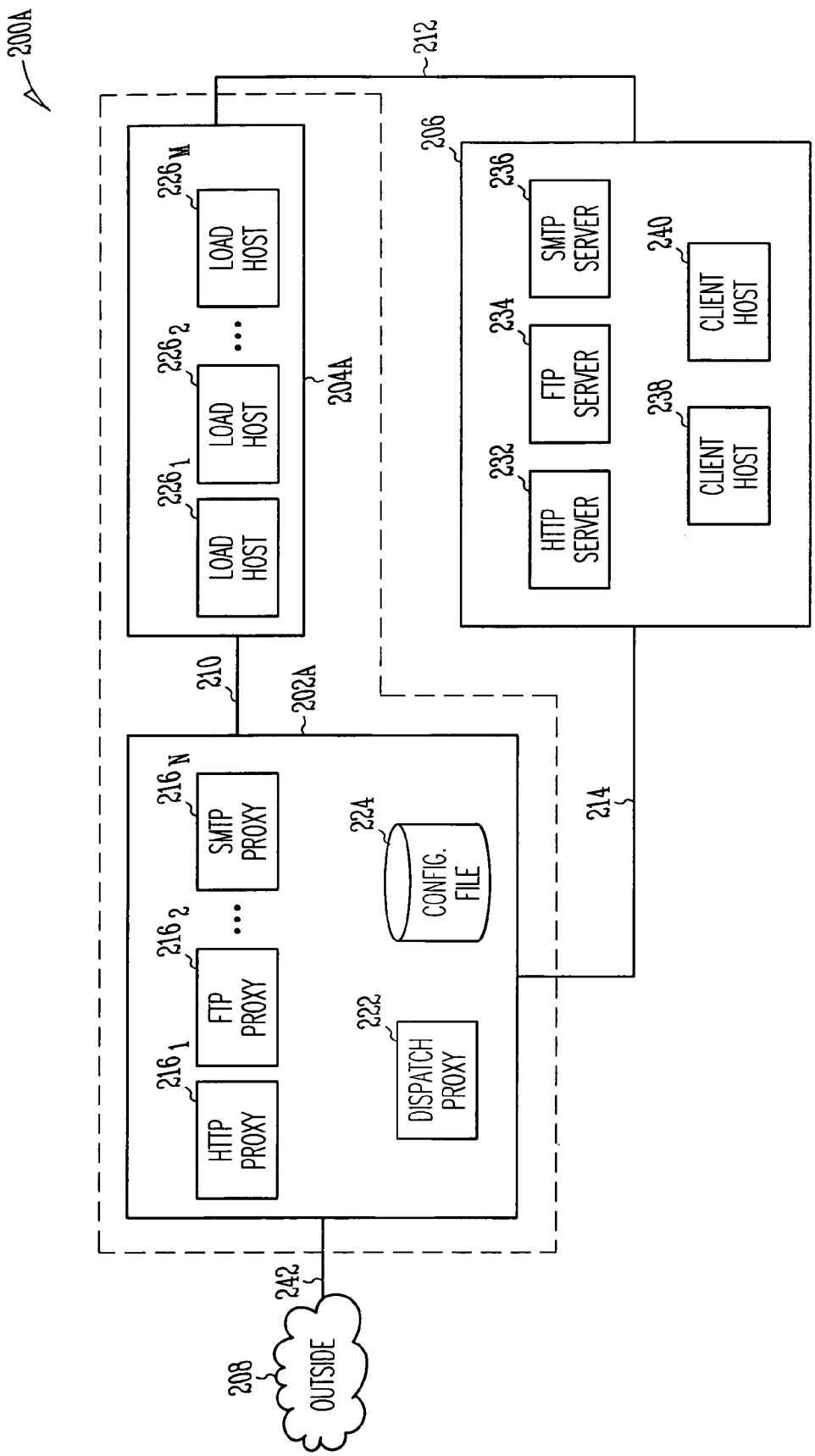

FIG. 2A illustrates an embodiment of a firewall system. Firewall system 200A operates to mediate traffic between an outside network 208 and an inside/trusted network 206. In the illustrated embodiment, firewall system 200A includes a dispatch host computer 202A. The system 200A also includes a set of one or more load host computers 204, which are individually designated as load hosts $226_1$–$226_M$.

The dispatch host computer 202A and the load host computers $226_1$–$226_M$ can be referred to as bastion hosts. Typically, a bastion host serves as a platform for an application-level gateway. A network administrator can install one or more proxy applications on the bastion host. Each proxy on a bastion host operates independently of other proxies on the bastion host.

In one embodiment, the load host $226_1$–$226_M$ can be a multi-purpose bastion host, which supports multiple proxies. Alternatively, a load host $226_1$–$226_M$ can be protocol specific and only support a single protocol. As can be appreciated, the dispatch host computer 202A and load host computers $226_1$–$226_M$ can be any conventional computer or system that can store and run one or more applications.

The dispatch host computer 202A and the load host computers $226_1$–$226_M$ are situated between an outside network 208 and an inside/trusted network 206. The firewall system 200A provides proxy firewall services for the inside/trusted network 206. The inside network 206 can include application servers, such as HTTP server 232, FTP server 234, and SMTP server 236, and client hosts 238, 240.

The outside network 208 is connected to the dispatch host computer 202A through communication link 242. It can be appreciated that the concepts of the present invention are not limited by the particular embodiment of link 242 that enables the connection to outside network 208.

In the illustrated embodiment, the dispatch host computer 202A is coupled to the set of load hosts 204 via connection 210, and to the inside network 206 via connection 214. The set of load hosts 204 is also coupled to inside network 206 via connection 212. As would be appreciated, the specific type and implementation of connections 210, 212, 214 would be dependent upon the particular network and security configuration.

In the illustrated embodiment, the dispatch host 202A includes proxy applications $216_1$–$216_N$. It can be appreciated that any number of proxy applications may be provided. Examples of the proxy applications $216_1$–$216_N$ include an HTTP proxy application, an SMTP proxy application, and an FTP proxy application.

As shown in FIG. 2A, the set of load hosts 204 includes several individual load hosts $226_1$–$226_M$. It can be appreciated that any number of load hosts may be provided in the computer system 200A. As will be described in greater detail below, it is a feature of the present invention that the load hosts $226_1$–$226_M$ can support multiple proxy applications and/or may be dedicated to a single proxy application.

In the illustrated embodiment, the dispatch host 202A also includes a dispatch proxy 222. Dispatch proxy 222 is an application that functions as a monitoring element that listens on multiple ports of the dispatch host 202A for incoming connections. The dispatch proxy 222 can identify incoming connections for more than one protocol. The dispatch proxy 222 consults a configuration file that includes listening and forwarding instructions for particular types of protocol traffic that are arriving on multiple ports. For example, the dispatch host 202A can include instructions for the dispatch proxy 222 that if any HTTP connection comes in on port 80, then the HTTP connection should be forwarded to a supporting load host $226_1$–$226_M$ for processing.

Depending upon the particular configuration of the firewall system 200A, the dispatch proxy 222 can be configured to distribute incoming connections to one or more firewall load hosts $226_1$–$226_M$. When an incoming connection is identified, the dispatch proxy 222 consults a configuration file that includes information regarding which load host $226_1$–$226_M$ in the firewall system 200A should receive and process the connection. Once the dispatch proxy 222 establishes the connection between outside network 208 and one of the load hosts $226_1$–$226_M$, the dispatch proxy 222 does not perform any additional logging or filtering on the context of the session.

It should be noted that dispatch host 202A can also be configured to support one or more proxy applications $216_1$–$216_N$. In this configuration, the incoming connection can alternatively be processed by one of proxy applications $216_1$–$216_N$ instead of a proxy application running on one of the load hosts $226_1$–$226_M$. In general, the decision on whether dispatch host 202A or one of the load hosts $226_1$–$226_M$ should process the incoming connection can be based on any policy that seeks to effectively utilize system resources.

As noted, in some applications, dispatch proxy 222 functions in a passive manner in listening for and forwarding incoming connections. For example, the majority of protocols (e.g., HTTP) are received on a port and can be directly plugged to the corresponding port on one of the load hosts $226_1$–$226_M$. In this scenario, the ports are constant and are determined prior to the invocation of the dispatch proxy 222.

Other protocols, however, do not allow for a simple, predetermined plugging by the dispatch proxy 222. These protocols may operate on multiple ports that are determined during the connection. An example of this type of protocol is FTP, which utilizes a control channel and a data communication channel. For the control channel, the incoming connection arrives on port 20 from a client computer on outside network 208. The ports for this connection are known prior to the invocation of dispatch proxy 222.

However, the client-side port for the data communication channel is not known prior to the receipt of the incoming connection on port 20. Rather, the client-side port is determined (either actively or passively) based on communication that occurred on the control channel. Thus, to effectively plug an FTP connection through dispatch host 202A, the dispatch proxy 222 would be configured to dynamically monitor the control channel to determine where to send the requested information.

As illustrated in FIG. 2A, the dispatch host computer 202A also includes a configuration file 224. The configuration file 224 includes information regarding the load hosts $226_1$–$226_M$ in the firewall system 200A. It can be appreciated that the configuration file 224 can be any standard file, table, or object in which data can be stored, sorted, and updated.

The configuration file 224 maintains specific information relating to the load hosts $226_1$–$226_M$. Some examples of information maintained for each load host $226_1$–$226_M$ are the identification of the load host; the IP address of the load host; the number of ports or the capacity of the load host; the number of current connections on the load host; the number of connections sent to the load host (historical information); the percentage of the total number of simultaneous proxied connections the load host can or could support; the protocols assigned to each of the ports; the previous port number to which a connection was forwarded; the load host's percentage of the load across all of the load hosts; and the proxy applications supported by the load host. It will be appreciated that any combination of the information identified above as well as other relevant load host information may be maintained in the configuration file 224.

The configuration file 224 maintains and updates a list of available proxy applications on the load hosts $226_1$–$226_M$ in the firewall system 200A. In one embodiment, the configuration file 224 is automatically updated to reflect the status of load hosts $226_1$–$226_M$. For example, when the dispatch proxy 222 forwards or routes a connection to a particular load host (e.g., $226_1$), the firewall system 200A updates the configuration file 224 to increment the entry for the number of connections that are being processed on load host $226_1$. When a connection is terminated, the entry for the number of connections that are being handled by that load host is decremented.

Similarly, when a load host is added to the firewall system 200A, the newly added load host and the dispatch host 202A communicate with each other. The dispatch host 202A and new load host can utilize messaging (e.g., via a sub-network) to determine that the new load host has been connected. As can be appreciated, the messaging may take a variety of forms. One type of messaging scheme is a regular polling of the load hosts $226_1$–$226_M$ by the dispatch host 202A to see which load hosts $226_1$–$226_M$ are connected. Another type of messaging is the signaling by the newly added load host upon connection. The message or signal is forwarded to the dispatch host 202A and the configuration file 224 is updated accordingly.

In an alternative embodiment, the configuration file 224 can be manually updated to reflect the addition of a load host $226_1$–$226_M$ to the firewall system 220A. After a load host $226_1$–$226_M$ is added, an operator can update the configuration file 224 through a computer or other user interface that has visibility into dispatch host 202A.

In general, the configuration file 224 enables the addition and removal of a load host $226_1$–$226_M$ from the firewall system 200A without any disruption of the traffic flow to other load hosts $226_1$–$226_M$. Once an incoming connection is identified, the configuration file 224 is reviewed by the dispatch proxy 222 for information relating to the load hosts $226_1$–$226_M$. The dispatch proxy 222 then determines to which load host $226_1$–$226_M$ it should forward the incoming connection. As noted above, dispatch host 202A can also determine that the incoming connection should be processed by dispatch host 202A, provided that the appropriate proxy application is supported by dispatch host 202A.

In general, the load host determination process can be based on the analysis of a variety of factors. Some relevant factors can include the following: when was a connection last forwarded to a load host; which load hosts include proxy applications that support the protocol of the connection; the availability of each load host; the capacity of a load host; the next load host to be used; the last load host that was used; the protocol of the connection; and whether the protocol of the connection is a resource intensive protocol. It can be appreciated that any combination of the above factors as well as other relevant factors may be considered when determining where to forward the connection. The operation of the connection forwarding process is discussed in greater detail below.

FIG. 2B illustrates another embodiment of a proxy firewall service system. In this embodiment, the dispatch host 202B of computer system 200B does not include any proxy applications (designated as elements $216_1$–$216_N$ in FIG. 2A). Accordingly, the dispatch host 202B does not perform any proxy services itself. All traffic from the outside network 208 that requires firewall services is routed to one of the load hosts $226_1$–$226_M$. The particular load host $226_1$–$226_M$ that receives and processes the connection can be determined based on the analysis of one or more of the factors discussed above. In this scenario, all of the proxy firewall services for computer system 200B are performed by the load hosts $226_1$–$226_M$.

Figure 2C:
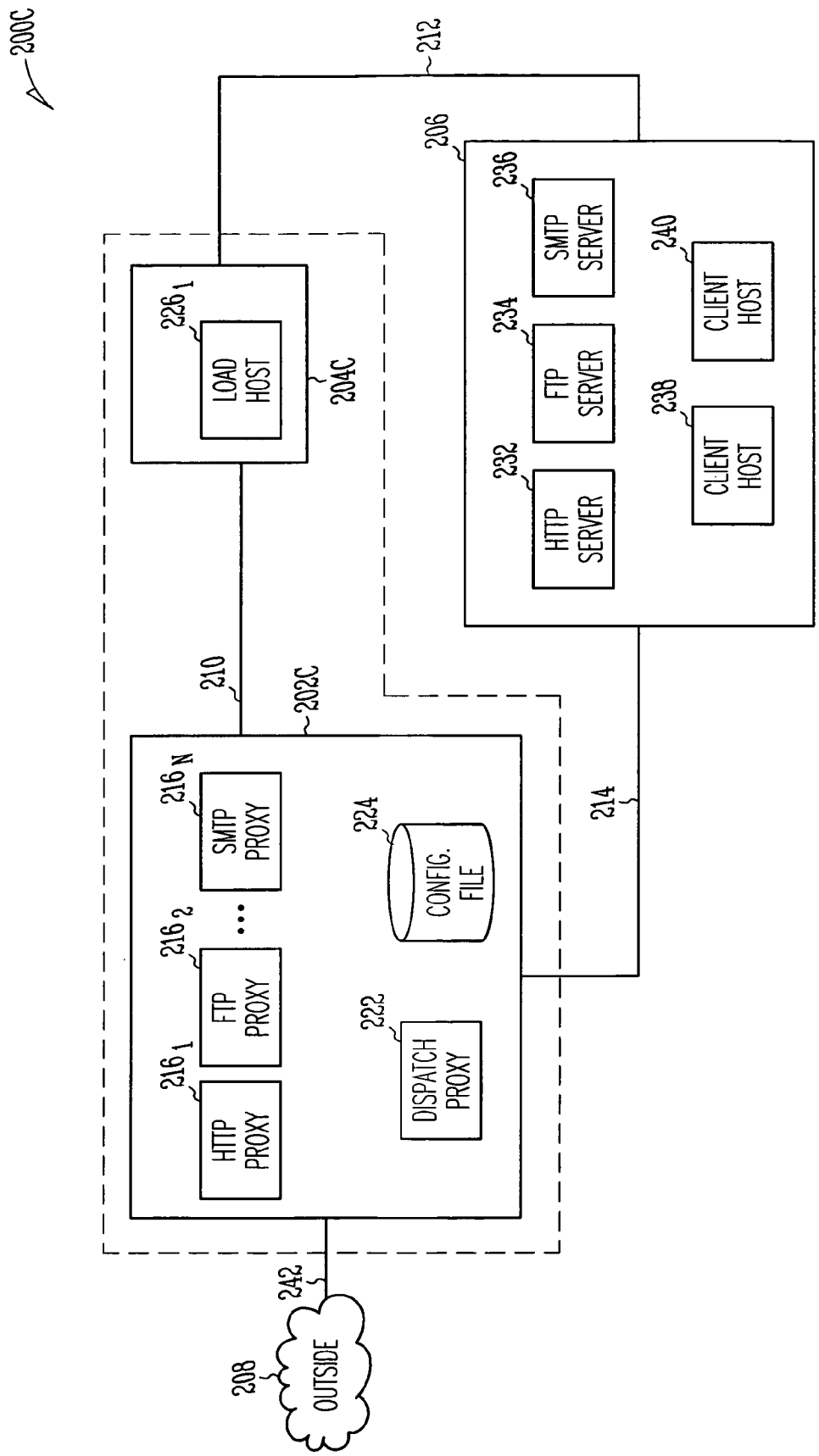

FIG. 2C illustrates a further embodiment of a proxy firewall service system. In this embodiment, the dispatch host 202C includes a plurality of proxy applications $216_1$–$216_N$. Firewall system 200C also includes a single load host 244. Load host 244 may be dedicated to a single protocol, such as a resource intensive protocol.

Since the dispatch host computer 202C supports proxy applications $216_1$–$216_N$, the non-resource intensive traffic is handled at the dispatch host computer 202C. If the incoming connection represents a resource intensive protocol, then the connection is forwarded by dispatch proxy 222 to the load host 244 for processing.

As would be appreciated, some protocols require substantial resources to process incoming traffic. For example, providing proxy firewall services for e-mail application is resource intensive. Processing e-mail traffic includes the resource intensive process of scanning messages and attachments for viruses. In the illustrated embodiment of FIG. 2C, destination load host 244 can be dedicated to provide support for e-mail traffic processing.

Through the provision of a single load host 244, load host 244 can be viewed as providing dedicated and exclusive support for a resource intensive protocol. In other words, load host 244 is the only load host in the firewall system 200C that provides support for that protocol. As would be appreciated, further dedicated load hosts 244 can be inserted into firewall system 200C, thereby providing dedicated but non-exclusive support for the resource intensive protocol.

The provision of additional dedicated load hosts 244 is a further example of the scalability provided by the present invention. Additional capacity can be added to ensure that all connections from the outside network 208 would be processed.

As can be appreciated, there are numerous variations of the firewall systems illustrated in FIGS. 2A–2C. Several potential variations are described below.

In one embodiment, the firewall system can include multiple load hosts. One or more of the load hosts can be dedicated to a single protocol, such as a resource intensive protocol. The remainder of the load hosts can be multi-purpose load hosts that support multiple protocols. For example, one load host can be dedicated to running a mail proxy and processing all of the mail traffic for a system. Each of the other load hosts may include support for proxy applications such as an HTTP proxy, an FTP proxy, and an SMTP proxy.

In another embodiment, the dispatch host of the firewall system can include a single proxy application that supports a single protocol. The rest of the traffic from the outside network requiring firewall services is processed by load hosts that can be multi-purpose or support a single proxy. For example, the dispatch host may include an FTP proxy application. All incoming traffic, other than FTP traffic, which requires firewall services is forwarded to one of the load hosts.

The ability of a firewall system to process particular traffic both at the dispatch host and at a load host provides benefits and flexibility to the system. The option of processing at the dispatch host and at a load host enables the accommodation of the peak loading of the firewall system. In one embodiment, the majority of traffic is processed by proxy applications at the dispatch host and any traffic that the dispatch host cannot process is forwarded to the load hosts. For example, if the HTTP proxy application on the dispatch host is at capacity and another HTTP connection is received from the outside network, the dispatch host can forward the HTTP connection to a load host that is running an HTTP proxy. In another embodiment, the majority of incoming traffic is processed by load hosts and any traffic that cannot be forwarded to a load host is processed by a proxy application at the dispatch host.

Another benefit of processing at the dispatch host and the load host is that a safety or fail over system is created. For example, if incoming traffic can be processed at either the dispatch host or a load host and the dispatch host fails during operation of the firewall, then one of the load hosts can assume the role of a dispatching host. As would be appreciated, one or more of the load hosts would be configured to support the dispatch proxy in anticipation of their functioning as the dispatch host.

To support this failover mechanism, the load hosts would be aware of the connections and current loads of the other load hosts. This information would enable the load host to function as the dispatch host (if called upon) and make informed decisions about the routing of incoming connections.

As previously discussed, a load host can be added to a firewall system to increase the proxy firewall services. In one embodiment, a multi-purpose load host may be added to increase the overall capacity of the firewall system. For example, if a load host that supports HTTP, FTP, and SMTP proxy applications is added to the firewall system, the firewall system's capacity for those protocols is increased. In an alternative embodiment, a load host that is dedicated to a particular protocol can be added to the firewall system. For example, a load host that only supports an HTTP proxy is added. As a result, the firewall system's capacity to process HTTP traffic is increased.

Figure 3:
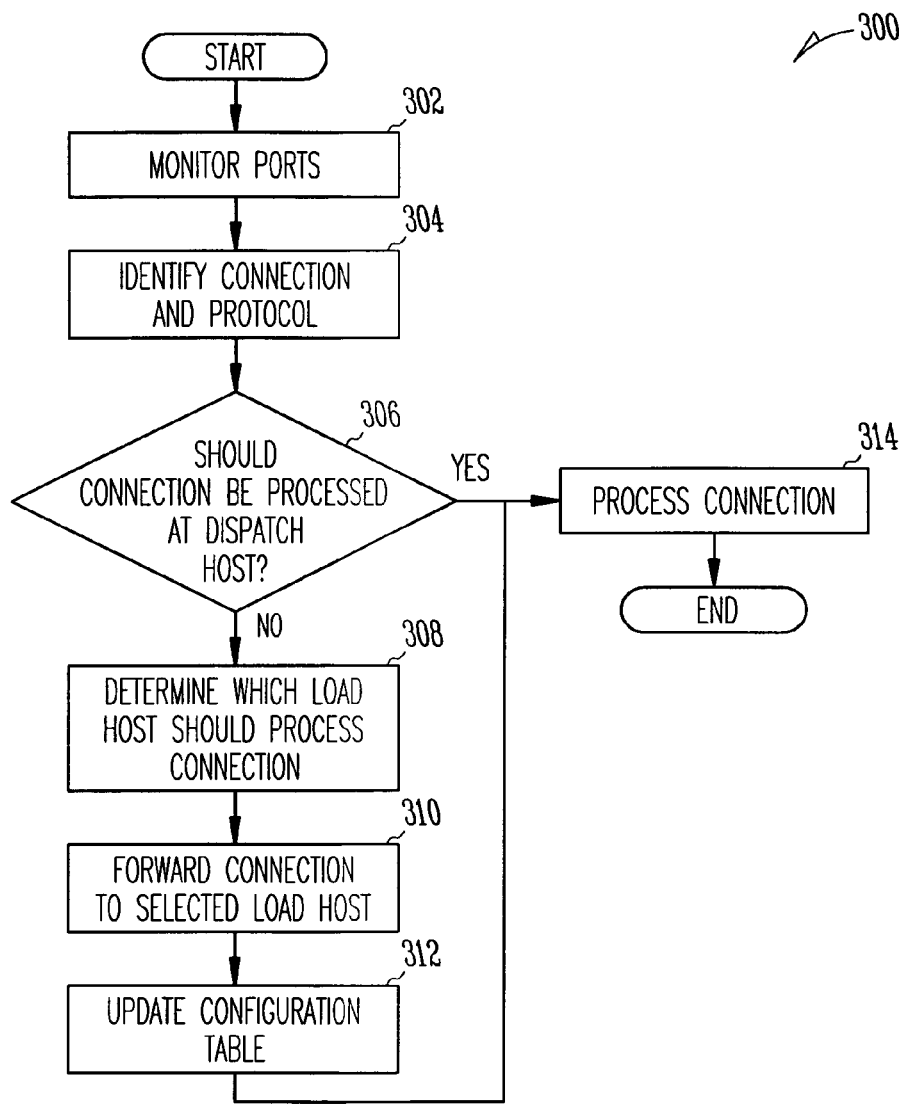
FIG. 3 is a flowchart of the operation of a proxy firewall service computer system.

The operation of the computer system 200A in a proxy firewall service process is now described. FIG. 3 illustrates a flowchart 300 of the proxy firewall service process. Flowchart 300 illustrates the steps that are performed in the forwarding of a connection to a proxy application for processing.

At step 302, the dispatch proxy 222 monitors the ports on the dispatch host 202A for incoming traffic. This is a continuous process that repeats itself after a connection is identified.

At step 304, based on the port on which a connection is received, the dispatch proxy 222 identifies the protocol of the connection. For example, if a connection is received on port 25, then the dispatch proxy can determine that the protocol of the connection is SMTP. The protocol is utilized to determine which proxy application in the computer system 200A should process the connection.

At step 306, the dispatch host 202A determines where the connection should be processed. In particular, it is determined whether the connection should be processed by a proxy application $216_1$–$216_N$ that resides on the dispatch host 202A. As noted above, the dispatch host 202A may not support the particular proxy application. Even if the particular proxy application is supported, it may be determined that one of the load hosts should process the incoming connection. As described above, this decision can be based on any criteria that can impact general resource utilization.

In one example, the dispatch host 202A can implement a security policy that all mail messages that arrive from particular addresses are subject to anti-virus scanning. Further, all anti-virus scanning can be offloaded to a particular load host. In this framework, dispatch host would determine whether an incoming mail message is subject to anti-virus scanning. If anti-virus scanning is not required, then the dispatch host processes the message. If anti-virus scanning is required, then the connection is forwarded to the designated load host. Resources on the dispatch host 202A are thereby conserved.

If the dispatch host 202A determines that it should not or cannot process the connection, then the connection is forwarded to a load host. At step 308, the dispatch proxy 222 selects one of the load hosts to process the connection. As noted, this selection can be based on a variety of factors. In one example, the dispatch proxy 222 performs a round-robin load distribution among the load hosts. In another example, the dispatch proxy 222 reviews the load host capacity values from the configuration file to ensure that the load host is evenly distributed. In a still further example, a load host may be selected if it is the only load host to support that particular protocol.

At step 310, the dispatch proxy 222 forwards the connection to the selected load host.

At step 312, the configuration file 224 in the dispatch host 202A is updated to reflect that the connection has been forwarded to a particular load host or hosts. The configuration file may be updated automatically upon the forwarding of the connection. In particular, the number of current connections to the load host is incremented.

Once the connection is forwarded to a load host (step 310) or remains at the dispatch host 202A, at step 314, proxy firewall services are performed on the connection. If the decision at step 306 is that the connection should be processed at the dispatch host, an appropriate proxy application on the dispatch host 202A processes the connection. The proxy application then determines whether the connection should be forwarded to the inside network 206.

While the invention has been described in detail and with reference to specific embodiments thereof, it will be apparent to one skilled in the art that various changes and modifications can be made therein without departing from the spirit and scope thereof. Thus, it is intended that the present invention covers the modifications and variations of this invention provided they come within the scope of the appended claims and their equivalents.

What is claimed is:

1. A computer system for providing proxy firewall services for a computer network, comprising:
    a dispatch host computer, said dispatch host computer being connectable to an external network; and
    at least one load host computer coupled to said dispatch host computer, said at least one load host computer configured to provide proxy firewall services, said at least one load host computer being connectable to one or more application servers, wherein said connection from the external network is distributed from said dispatch host computer to a particular load host computer based on an analysis of the type of protocol of the connection and an analysis of activity across the load host computers;
    wherein said at least one load host computer and said dispatch host computer communicate information regarding the connection of said at least one load host computer to the computer system;
    wherein said dispatch host computer includes a configuration file with information relating to load host computers in the computer system, wherein upon the connection of another load host computer to the computer system, said configuration file is updated to reflect the availability of said another load host computer in the computer system.

2. The computer system of claim 1, wherein said dispatch host computer includes a monitoring element that listens for connections on multiple ports.

3. The computer system of claim 2, wherein said monitoring element is a dispatch proxy.

4. The computer system of claim 1, wherein said at least one load host computer is a protocol specific load host computer.

5. The computer system of claim 1, wherein said at least one load host computer can handle multiple protocols.

6. The computer system of claim 1, wherein said dispatch host computer provides proxy firewall services.

7. A method of providing proxy firewall services for a computer network, comprising: identifying a set of load host computers, each load host computer in said set of load host computers being configured to provide proxy firewall services;
    monitoring one or more incoming ports at a dispatch host computer for a connection;
    upon identification of said connection, selecting from said set of load host computers a load host computer to which said connection should be forwarded based on an analysis of the type of protocol of said connection and an analysis of activity across the load host computers;
    wherein said identifying comprises communicating information between said dispatch host computer and said load host computers relating to the availability of said load host computers.

8. The method of claim 7, wherein said monitoring comprises monitoring for a connection with a dispatch proxy that monitors one or more incoming ports on said dispatch host computer simultaneously.

9. The method of claim 7, wherein said selecting comprises selecting a load host computer based on a round robin load distribution among said load host computers.

10. The method of claim 7, wherein said selecting comprises selecting a load host computer based on the availability of the load host computers.

11. The method of claim 7, wherein said selecting comprises selecting a load host computer based on the percentage of the total number of simultaneous proxied connections the load host computer can support.

12. The method of claim 7, wherein said selecting comprises selecting a load host computer that can support a resource intensive protocol.

13. A firewall network resource method comprising: identifying a resource intensive protocol;
    designating a load host computer for providing primary support for said resource intensive protocol; and
    routing a connection for said resource intensive protocol from a dispatch host computer to said designated load host, wherein said designated load host provides exclusive support for said resource intensive protocol and wherein designating includes analyzing activity across a plurality of host computers and selecting a load host computer based on the load host computer activity analysis.

14. The method of claim 13, further comprising:
    processing on the dispatch host computer a connection for at least one protocol other than said resource intensive protocol.

15. The method of claim 13, wherein said designated load host is dedicated to said resource intensive protocol.

16. The method of claim 13, further comprising:
    designating another load host for multi-purpose support.

17. The method of claim 13, wherein said dispatch host computer has multi-purpose support.

18. A method of expanding proxy firewall services for a computer network comprising: receiving a connecting at a dispatch host computer;
    selecting a first load host computer to which the connection should be forwarded;

forwarding said connection to said first load host computer;

connecting a second load host computer to said dispatch host computer; and updating a configuration file on said dispatch host computer to reflect the connection of said second load host computer, wherein upon said updating, said second load host computer is available to process forwarded connections from said dispatch host computer, wherein said updating comprises communicating information between said dispatch host computer and said second load host computer regarding the availability of said second load host computer.

19. The method of claim 18, wherein said connecting and said updating occur during the provision of proxy firewall services.

20. The method of claim 18, wherein said connecting includes signaling the dispatch host computer upon connection.

* * * * *